(12) United States Patent
Belleville (10) Patent No.: US 12,438,693 B2
(45) Date of Patent: Oct. 7, 2025

(54) PROTECTION AGAINST SIDE-CHANNEL ATTACKS USING A SQUARE MASKING

(71) Applicant: COMMISSARIAT A L'ENERGIE ATOMIQUE ET AUX ENERGIES ALTERNATIVES, Paris (FR)

(72) Inventor: Nicolas Belleville, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 238 days.

(21) Appl. No.: 18/303,653

(22) Filed: Apr. 20, 2023

(65) Prior Publication Data

US 2023/0344616 A1 Oct. 26, 2023

(30) Foreign Application Priority Data

Apr. 25, 2022 (FR) ..................................... 22 03809

(51) Int. Cl.
*H04L 9/00* (2022.01)

(52) U.S. Cl.
CPC .................................. *H04L 9/003* (2013.01)

(58) Field of Classification Search
CPC ... H04L 9/003; H04L 63/1441; G06F 21/556; G06F 2221/2123; H04B 7/005
See application file for complete search history.

(56) References Cited

U.S. PATENT DOCUMENTS 7,162,031 B1 * 1/2007 Roelofsen ............... H04L 9/003
380/28
7,848,514 B2 * 12/2010 Gebotys .................. H04L 9/003
380/42

(Continued)

FOREIGN PATENT DOCUMENTS

| EP | 1 068 695 B1 | 4/2010 |
| EP | 2 302 552 B1 | 12/2017 |
| EP | 3 593 483 B1 | 4/2021 |

OTHER PUBLICATIONS

Tang et al.; "PFD—A Flexible Higher-Order Masking Scheme", Aug. 2017, IEEE Transactions on Computer-Aided Design of Integrated Circuits and Systems, vol. 36, No. 8, pp. 1327-1339. (Year: 2017).*

(Continued)

*Primary Examiner* — Matthew Smithers
(74) *Attorney, Agent, or Firm* — Oblon, McClelland, Maier &Neustadt, L.L.P.

(57) ABSTRACT

The present invention relates to a method for protecting an electronic device against side-channel attacks. The electronic device is configured to execute a cryptographic algorithm comprising operations in a binary finite field $GF(2^n)$, n being a positive integer. The algorithm uses at least one secret variable s to be protected. The method includes:

determining a random variable k, computing a masked representation M(s, k) of the secret variable s using a masking function M including an exponentiation by $2^k$, for each operation involving a sensitive variable v corresponding to the secret variable s or to an intermediate result obtained from the secret variable s, executing the operation from a masked representation M(v, k') of the sensitive variable v, determining an output variable r from a final result obtained in the form of a masked representation M(r, k").

15 Claims, 4 Drawing Sheets

(56) References Cited

U.S. PATENT DOCUMENTS

| | | | | |
|---|---|---|---|---|
| 8,402,287 | B2* | 3/2013 | Vigilant | H04L 9/003 380/28 |
| 8,577,025 | B2* | 11/2013 | Fumaroli | G06F 21/755 380/28 |
| 11,507,699 | B2* | 11/2022 | Wierzynski | H04L 9/003 |
| 2005/0232430 | A1* | 10/2005 | Gebotys | H04L 9/003 380/286 |
| 2006/0256963 | A1* | 11/2006 | Gebotys | H04L 9/0618 380/205 |
| 2009/0116644 | A1* | 5/2009 | Klimov | H04L 9/0625 380/252 |
| 2010/0100748 | A1* | 4/2010 | Hubert | G06F 7/723 713/189 |
| 2011/0129084 | A1* | 6/2011 | Fumaroli | G06F 21/755 380/28 |
| 2011/0145595 | A1* | 6/2011 | Kim | G06F 21/72 713/189 |
| 2012/0124669 | A1* | 5/2012 | Carpenter | G06F 21/71 726/25 |
| 2014/0281573 | A1* | 9/2014 | Jaffe | H04L 9/003 713/189 |
| 2015/0222423 | A1* | 8/2015 | Pepin | H04L 9/0631 713/189 |
| 2017/0033923 | A1* | 2/2017 | Melzani | G06F 7/588 |
| 2017/0281573 | A1* | 10/2017 | Schwarz | A61K 9/2054 |
| 2018/0351729 | A1* | 12/2018 | Tunstall | H04L 9/003 |
| 2020/0034573 | A1* | 1/2020 | Pulkus | G06F 21/755 |
| 2021/0157586 | A1* | 5/2021 | Vigilant | H04L 9/002 |
| 2023/0246806 | A1* | 8/2023 | Wang | H04L 9/302 713/189 |

OTHER PUBLICATIONS

Miyajan et al.; "Speedup Higher-Order Masking of AES using Normal Basis and SIMD", 2016, IEEE, pp. 293-298. (Year: 2016).*

Roche et al., "Higher-order glitch free implementation of the AES using Secure Multi-Party Computation protocols", 2012, Springer-Verlag, pp. 111-127. (Year: 2012).*

French Preliminary Search Report and Written Opinion issued Dec. 9, 2022, in French Application 22 03809 filed on Apr. 25, 2022, 9 pages (with English Translation of Categories of Cited Documents).

Goubin et al., "Protecting AES with Shamir's Secret Sharing Scheme" Sep. 28, 2011, $18^{th}$ International Conference, Austin, TX, USA, Sep. 24-27, 2015; [Lecture Notes in Computer Science; Lect. Notes Computer], Springer, Berlin, Heidelberg, pp. 79-94, XP047309597, ISBN: 978-3-540-74549-5.

Prouff et al., "Higher-Order Glitches Free Implementation of the AES Using Secure Multi-party Computation Protocols" Sep. 28, 2011, $18^{th}$ International Conference, Austin, TX, USA, Sep. 24-27, 2015; [Lecture Notes in Computer Science; Lect. Notes Computer], Springer, Berlin, Heidelberg, pp. 63-78, XP047309596, ISBN: 978-3-540-74549-5.

Belleville et al., "Maskara: Compilation of a Masking Countermeasure with Optimized Polynomial Interpolation" IEEE Transactions on Computer-Aided Design of Integrated Circuits and Systems, IEEE, USA, vol. 39, No. 11, Jul. 30, 2020, pp. 3774-3786, XP011818290, ISSN: 0278-0070, DOI: 10.1109/TCAD.2020. 3012237.

Fumaroli et al., "Affine Masking against Higher-Order Side Channel Analysis" SAC, 2010, 25 pages.

Coron et al., "Fast Evaluation of Polynomials over Binary Finite Fields and Application to Side-channel Countermeasures" CHES, 2014, 20 pages, www.springerlink.com.

* cited by examiner

PROTECTION AGAINST SIDE-CHANNEL ATTACKS USING A SQUARE MASKING

TECHNICAL FIELD

The present invention relates to a method for protecting an electronic device against side-channel attacks. The invention also relates to an electronic device implementing such a method.

PRIOR ART

There are currently numerous electronic devices including a processor configured to execute a cryptographic algorithm. A cryptographic algorithm generally uses at least one secret variable that needs to be hidden, for example an encryption key. Such an electronic device corresponds for example to a chip card, a cryptographic component (for example a microcontroller type integrated circuit), or an electronic device including a cryptographic component (computer, mobile phone, payment card, electronic signature creation device, etc.).

The cryptographic algorithms considered in the present application use a secret key to compute an item of output information from an item of input information. This may include for example an encryption, decryption, authentication, signature, or signature verification procedure. This concerns symmetric cryptographic algorithms (secret-key algorithms) but also asymmetric cryptographic algorithms (algorithms using a secret key and a public key), and post-quantum cryptographic algorithms. AES (acronym of "Advanced Encryption Standard") is an example of a symmetric cryptographic algorithm. It is now considered as relatively secure and used in numerous applications (for example in the encryption of certain communication applications, hard drive encryption or Wi-Fi communication encryption). RSA encryption (thus named after the initials of its three inventors) is an example of an asymmetric cryptographic algorithm. It is widely used in e-commerce and for exchanging confidential data on the Internet. McEliece encryption is another example of an asymmetric cryptographic algorithm.

These algorithms are constructed such that it is in practice not possible to discover the secret key only from the input information and the output information.

The operations executed by the processor of the electronic device to implement the cryptographic algorithm give rise to variations of certain physical quantities such as electricity consumption, electromagnetic radiation, temperature, sound intensity or execution time. These variations are dependent on the data used in the different operations. More specifically, insofar as certain algorithm operations involve the secret key, the variations observed can have a correlation with the value of the secret key. A malicious person can then make measurements of one or more physical quantities, then exploit these measurements by statistical analysis in order to obtain information on the secret key used by the algorithm.

This type of attack is known as a "side-channel attack" (SCA). Several types of side-channel attacks are known, for example DPA (acronym of "Differential Power Analysis"), template, or CPA (acronym of "Correlation Power Analysis") attacks.

The order of a side-channel attack is generally defined according to the number of variables that the attacker is seeking to determine using the observed measurements. For example, for a first-order attack, the attacker is only interested in the value of one variable at a given time. For a second-order attack, the attacker is interested in the value of two different variables at two potentially different given times. It is generally accepted that the difficulty of implementing a side-channel attack increases exponentially with the order of the attack.

It is known to protect an electronic device against side-channel attacks by masking the secret variables used by the cryptographic algorithm and by modifying the operations performed on these secret variables (or on intermediate variables computed using secrete variables) so that the operations relate to masked representations of these variables and no longer directly to the variables per se. It is necessary for this to modify the operations of the algorithm to adapt them to the masking technique used.

Different masking techniques exist. The general principle of masking is to separate a secret variable into several parts ("shares"). The operations of the algorithm are then performed on the different shares of the secret variable and no longer directly on the secret variables per se. It is then possible, thanks to the knowledge of the values of the shares into which the secret variable has been initially separated, to determine the output value of the algorithm using an end result of the algorithm operations performed on said shares. The different masking techniques share this principle, but use different sorts of decomposition of a secret variable.

A first example is Boolean masking, for which a secret variable s is separated into a first share $p_1$ determined at random and a second share $p_2$ defined such that $s=p_1 \oplus p_2$. The operator $\oplus$ corresponds to addition in a binary finite field, which also corresponds to the bitwise "exclusive OR" operator ("XOR" operator). The second share $p_2$ is therefore defined by $p_2=s \oplus p_1$ (as $s \oplus p_1=p_1 \oplus p_1 \oplus p_2=p_2$). The shares $p_1$ and $p_2$ form a Boolean masking representation of the secret variable s.

A second example is multiplicative masking, for which a secret variable s is separated into a first non-zero share $p_1$ determined at random and a second share $p_2$ defined such that $s=p_1 \oplus p_2$. The operator $\oplus$ corresponds to multiplication in a binary finite field. The second share $p_2$ is then defined by $p_2=s \oplus (p_1\hat{\,}(-1))$. The operator $\hat{\,}$ corresponds to a binary finite field power, and the relation $a \oplus (a\hat{\,}(-1))=1$ is verified. The shares $p_1$ and $p_2$ form a multiplicative masking representation of the secret variable s.

A third example is affine masking, for which a first non-zero share $p_1$ and a second share $p_2$ are determined at random and a third share $p_3$ is determined as follows: $p_3=s \oplus p_1 \oplus p_2$. It consists of a combination between Boolean masking and multiplicative masking.

It is possible to separate the secret variable into a greater number of shares, using a greater number of random masks $p_1, p_2, \ldots, p_d$. For Boolean masking, this gives $s=p_1 \oplus p_2 \ldots \oplus p_d$. This masking technique is of order d. A masking technique of order d remains theoretically vulnerable to a side-channel attack of order d+1.

In the case of Boolean masking, the different shares of the secret variables are propagated in the operations of the algorithm such that each intermediate variable is independent of any secret variable. The value of each share, considered independently of the others, is distributed at random and remains independent of the value of the secret key. Consequently, a leak on a share does not reveal any information on the secret key. This thus renders a side-channel attack difficult to carry out.

In the case of multiplicative masking, the statistical independence of the different shares is not perfect as a secret equal to zero necessarily implies that a share is zero. However, each intermediate variable does not provide more information on the secret variable than the information already provided by a share of the secret variable.

Boolean masking, multiplicative masking and affine masking apply well to certain operations (such as Boolean operations, bitwise shift and sign extent for Boolean masking, multiplication or exponentiation as binary finite field operations for multiplicative masking). They are however not directly compatible with other operations (for example a modular addition or access to a table indexed by a secret).

Further masking techniques can then be used to perform these operations, such as for example arithmetic masking (which uses modular addition). It can also be envisaged to perform a polynomial interpolation of the operation to be performed and mask the evaluation of the interpolating polynomial. It is also possible to tabulate the operation and perform a masking of the table. When the cryptographic algorithm includes different types of operations which are only compatible with certain masking techniques, it is necessary to make conversions from one type of masking to another type of masking.

By way of example, the patent EP1068695B1 discloses a Boolean masking protection against side-channel attacks. The patent EP2302552B1 discloses an affine masking protection. The patent EP3593483B1 discloses a method for transition from a Boolean masking to an affine masking. The document "*Secure Multiplicative Masking of Power Functions*", L. GENELLE et al., discloses a use of multiplicative masking. The document "*Affine Masking against Higher-Order Side Channel Analysis*", G. FUMAROLLI et al., proposes combining Boolean masking with multiplicative masking to increase the level of security. The document "*Fast Evaluation of Polynomials over Binary Finite Fields and Application to Side-Channel Countermeasures*", J. S CORON et al., discloses a method for masking accesses to a constant table indexed with a secret (for example an AES algorithm "S-box" substitution table) using a polynomial interpolation of the table.

The choice of the type of masking to be used can be determined according to the operations used by the cryptographic algorithm. For example, Boolean masking is particularly low-cost in terms of computing complexity for "rotation" type operations, whereas multiplicative masking will be preferred for power operations.

However, the performances of Boolean masking are not always satisfactory, particularly if protection is needed against relatively high-order attacks. Indeed, the computing complexity becomes high when the number of shares into which a secret variable is to be separated is high. By way of example, the use of Boolean masking in an AES algorithm divides the performances of the algorithm by ten.

Furthermore, Boolean masking has a relatively poor resistance to leaks in transition. These are leaks associated with the change from one value to another. These transitions are modelled by an "exclusive OR". Thus, when a transition occurs between the two shares of the decomposition of a sensitive variable in Boolean masking, it shows the sensitive variable.

Therefore, it is necessary to find novel protection solutions against side-channel attacks in order to obtain an advantageous compromise between performance and security.

DISCLOSURE OF THE INVENTION

The aim of the present invention is to remedy some or all of the drawbacks of the prior art.

To this end, and according to a first aspect, the present invention proposes a method for protecting an electronic device against side-channel attacks. The electronic device includes a processor configured to execute a cryptographic algorithm comprising operations on elements belonging to a binary finite field $GF(2^n)$, n being a positive integer. At least some of said operations involve at least one secret variable s to be protected. The method is used by the processor of the electronic device and it includes:

a determination of a random variable k, a computation of a masked representation M(s, k) of said secret variable s using a masking function M including an exponentiation by $2^k$, the operator ^ corresponding to a binary finite field power, for each operation involving a sensitive variable v corresponding to said secret variable s or to an intermediate result obtained from said secret variable s, an execution of said operation from a masked representation M(v, k') of said sensitive variable v, a determination of an output variable r of the cryptographic algorithm from a final result obtained in the form of a masked representation M(r, k"), the variables k' and k" being determined from the variable k.

Such arrangements make it possible to obtain a particularly effective masking for addition, multiplication and power operations as binary finite field operations thanks to the linear behaviour of these operations with respect to an exponentiation by a power of two. Moreover, the masking obtained is robust against leaks in transition.

In specific implementations, the invention may further include one or more of the following features, taken in isolation or according to any technically possible combinations.

In specific implementations, the masking function M is a so-called "square masking" function such that, for a predetermined variable p:

$$\forall x \in GF(2^n), M(x,p) = x^{(2^p)}$$ [Math.1]

In specific implementations, when said operation involving the sensitive variable v corresponds to a binary finite field addition involving another variable w, the execution of said operation comprises a computation of a representation M(w, k') by square masking of said other variable w, and a computation of a binary finite field addition of M(v, k') with M(w, k').

In specific implementations, when said operation involving the sensitive variable v corresponds to a binary finite field multiplication involving another variable z, the execution of said operation comprises a computation of a representation M(z, k') by square masking of said other variable z, and a computation of a binary finite field multiplication of M(v, k') with M(z, k').

In specific implementations, for at least one operation involving a sensitive variable v, the execution of said operation comprises:

a conversion of the square masking representation of said sensitive variable to another masking, referred to as "conversion masking", an execution of said operation using a conversion masking representation of the sensitive variable, a conversion of a result of said operation from conversion masking to square masking.

In specific implementations, the conversion masking is a Boolean masking. The conversion of the square masking representation M(v, k') of the sensitive variable v to a Boolean masking representation then includes:

a determination of a random variable $v_0$, a computation of a variable $v_1$ such that $v_1=(v_0\hat{\,}(2\hat{\,}k'))\oplus M(v,k'))\hat{\,}(2\hat{\,}(-k'))$, the operator $\oplus$ corresponding to a binary finite field addition, the variables $v_0$ and $v_1$ form a Boolean masking representation whereon the operation is performed in order to obtain a result in the form of a Boolean masking representation taking the form of two variables $r_0$ and $r_1$, and the conversion of the result obtained to square masking includes the computation of a square masking representation in the form $r_0\hat{\,}(2\hat{\,}k')\oplus r_1\hat{\,}(2\hat{\,}k')=(r_0\oplus r_1)\hat{\,}(2\hat{\,}k)$.

In specific implementations, the conversion masking is a multiplicative masking. The conversion of the square masking representation $M(v, k')$ of the sensitive variable v to a Boolean masking representation then includes:

a determination of a non-zero random variable $v_0$, a computation of a variable $v_1$ such that $v_1=v_0\hat{\,}(2\hat{\,}k')\oplus M(v,k'))\hat{\,}(2\hat{\,}(-k'))$, the operator $\oplus$ corresponding to a binary finite field multiplication, the variables $v_0$ and $v_1$ form a multiplicative masking representation whereon the operation is performed in order to obtain a result in the form of a multiplicative masking representation taking the form of two variables $r_0$ and $r_1$, and the conversion of the result obtained to square masking includes the computation of a square masking representation in the form $r_0\hat{\,}(-(2\hat{\,}k'))\oplus r_1\hat{\,}(2^{\rightarrow}k')$.

In specific implementations, for at least one operation involving a sensitive variable, the execution of said operation comprises a polynomial interpolation of said operation and a computation of a square masking representation of an evaluation of said interpolating polynomial.

In specific implementations, the masking function M is a function combining a square masking and a Boolean masking, the masking function M being defined, for two predetermined variables p and a, according to one of the following expressions:

$$\forall x \in GF(2^n), M(x,p,a)=x\hat{\,}(2\hat{\,}p)\oplus a,$$

$$\forall x \in GF(2^n), M(x,p,a)=(x\oplus a)\hat{\,}(2\hat{\,}p). \quad \text{[Math.2]}$$

In specific implementations, the masking function M is a function combining a square masking and a multiplicative masking, the masking function M being defined, for a predetermined non-zero variable m and a predetermined variable p, according to one of the following expressions:

$$\forall x \in GF(2^n), M(x,p,m)=x\hat{\,}(2\hat{\,}p)\otimes m,$$

$$\forall x \in GF(2^n), M(x,p,m)=(x\otimes m)\hat{\,}(2\hat{\,}p), \quad \text{[Math.3]}$$

m being a non-zero random variable.

In specific implementations, the masking function M is a function combining a square masking and an affine masking, the masking function M being defined, for a non-zero variable m and two predetermined variables p and a, according to one of the following expressions:

$$\forall x \in GF(2^n), M(x,p,m,a)=(x\otimes m\oplus a)\hat{\,}(2\hat{\,}p),$$

$$\forall x \in GF(2^n), M(x,p,m,a)=(x\otimes m)\hat{\,}(2\hat{\,}p)\oplus a,$$

$$\forall x \in GF(2^n), M(x,p,m,a)=m\otimes x\hat{\,}(2\hat{\,}p)\oplus a,$$

$$\forall x \in GF(2^n), M(x,p,m,a)=m\otimes(x\hat{\,}(2\hat{\,}p)\oplus a),$$

$$\forall x \in GF(2^n), M(x,p,m,a)=m\otimes(x\oplus a)\hat{\,}(2\hat{\,}p),$$

$$\forall x \in GF(2^n), M(x,p,m,a)=(m\otimes(x\oplus a))\hat{\,}(2\hat{\,}p). \quad \text{[Math.4]}$$

According to a second aspect, the present invention relates to a computer program product for the execution of a cryptographic algorithm. The program comprises code instructions which, when they are executed by a processor of an electronic device, configure said processor to execute a method according to any one of the preceding implementations.

According to a third aspect, the present invention relates to an electronic device comprising a memory storing such a computer program product, and a processor configured to execute it.

According to a fourth aspect, the present invention relates to a method for protecting an electronic device against side-channel attacks. The electronic device includes a processor configured to execute code instructions of a cryptographic algorithm comprising operations on elements belonging to a binary finite field $GF(2^n)$, n being a positive integer. At least some of said operations involve at least one secret variable s to be protected. The method includes a modification of said code instructions by an automatic code conversion computing tool. The modification of said code instructions includes:

an addition of a determination of a random variable k, an addition of a computation of a masked representation $M(s,k)$ of said secret variable s using a masking function M including an exponentiation by $2\hat{\,}k$, the operator $\hat{\,}$ corresponding to a binary finite field power, a transformation of each operation involving a sensitive variable v corresponding to said secret variable s or to an intermediate result obtained from said secret variable s, such that said operation is performed from a masked representation $M(v, k')$ of said sensitive variable v, an addition of a determination of an output variable r of the cryptographic algorithm from a final result obtained in the form of a masked representation $M(r, k'')$, the variables k' and k'' being determined from the variable k.

According to a fifth aspect, the present invention relates to a computer program product for a computing tool for the automatic conversion of code of a cryptographic algorithm. The program comprises code instructions which, when they are executed by a processor, configure said processor to modify code instructions of the cryptographic algorithm according to a method according to the implementation described above.

BRIEF DESCRIPTION OF THE DRAWINGS

Further features and advantages of the invention will become apparent on reading a preferential embodiment of the invention, described with reference to the attached figures wherein.

DETAILED DISCLOSURE OF SPECIFIC EMBODIMENTS

Figure 1:
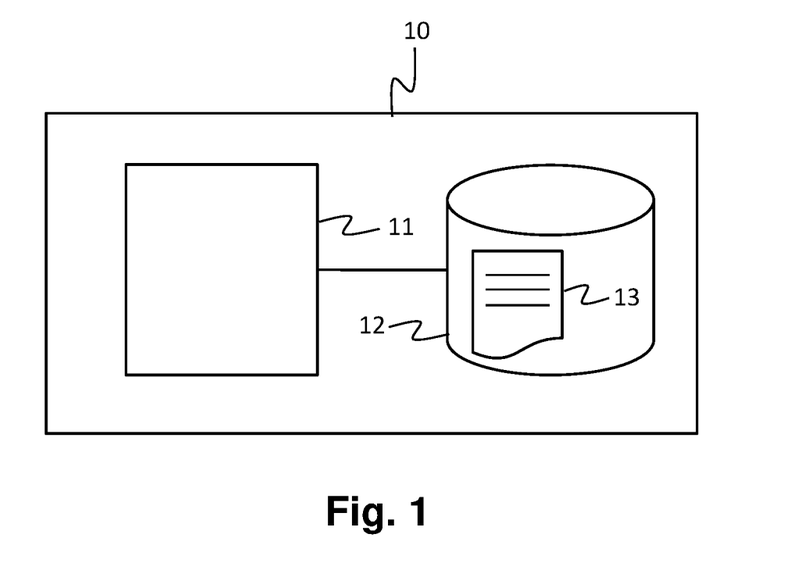
FIG. 1 schematically represents an electronic device configured to execute a cryptographic algorithm.

FIG. 1 schematically describes an electronic device 10 including a processor 11 configured to execute a cryptographic algorithm. The processor 11 is configured by code instructions 13 saved in a memory 12 of the electronic device 10. The code instructions 13 form a computer program (or computing program) which implements the cryptographic algorithm.

The electronic device 10 corresponds for example to a chip card, a cryptographic component (for example a microcontroller type integrated circuit), or an electronic device including a cryptographic component (computer, mobile phone, payment card, electronic signature creation device, etc.).

Figure 2:
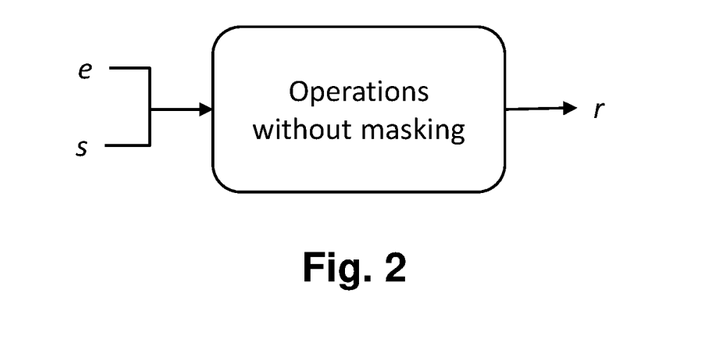
FIG. 2 schematically illustrates the implementation of a cryptographic algorithm in a case where the operations executed by the algorithm are not protected against side-channel attacks.

The cryptographic algorithm uses at least one secret variable s for computing an item of output information corresponding to an output variable r from an item of input information corresponding to an input variable e. FIG. 2 schematically illustrates such a cryptographic algorithm in a case where the operations executed by the algorithm are not protected against side-channel attacks (in this case, the operations are executed directly on the secret variable s, leaving a malicious person the possibility of obtaining information on the secret variable s by using a side-channel attack).

The cryptographic algorithm comprises operations on elements belonging to a binary finite field $GF(2^n)$, n being a positive integer. The cryptographic algorithm can particularly include binary finite field operations involving the secret variable s or intermediate variables obtained from the secret variable s. In the present application, the operator $\oplus$ corresponds to a binary finite field addition, i.e. a bitwise "exclusive OR"; the operator $\otimes$ corresponds to a binary finite field multiplication; the operator $\wedge$ corresponds to a binary finite field power; the operators + and − correspond respectively to modular addition and subtraction, for example modulo $2^n$ to remain in $GF(2^n)$.

By way of non-limiting example, the cryptographic algorithm considered can correspond to all or part of a symmetric or asymmetric cryptographic algorithm such as AES, RSA or McEliece.

Figure 3:
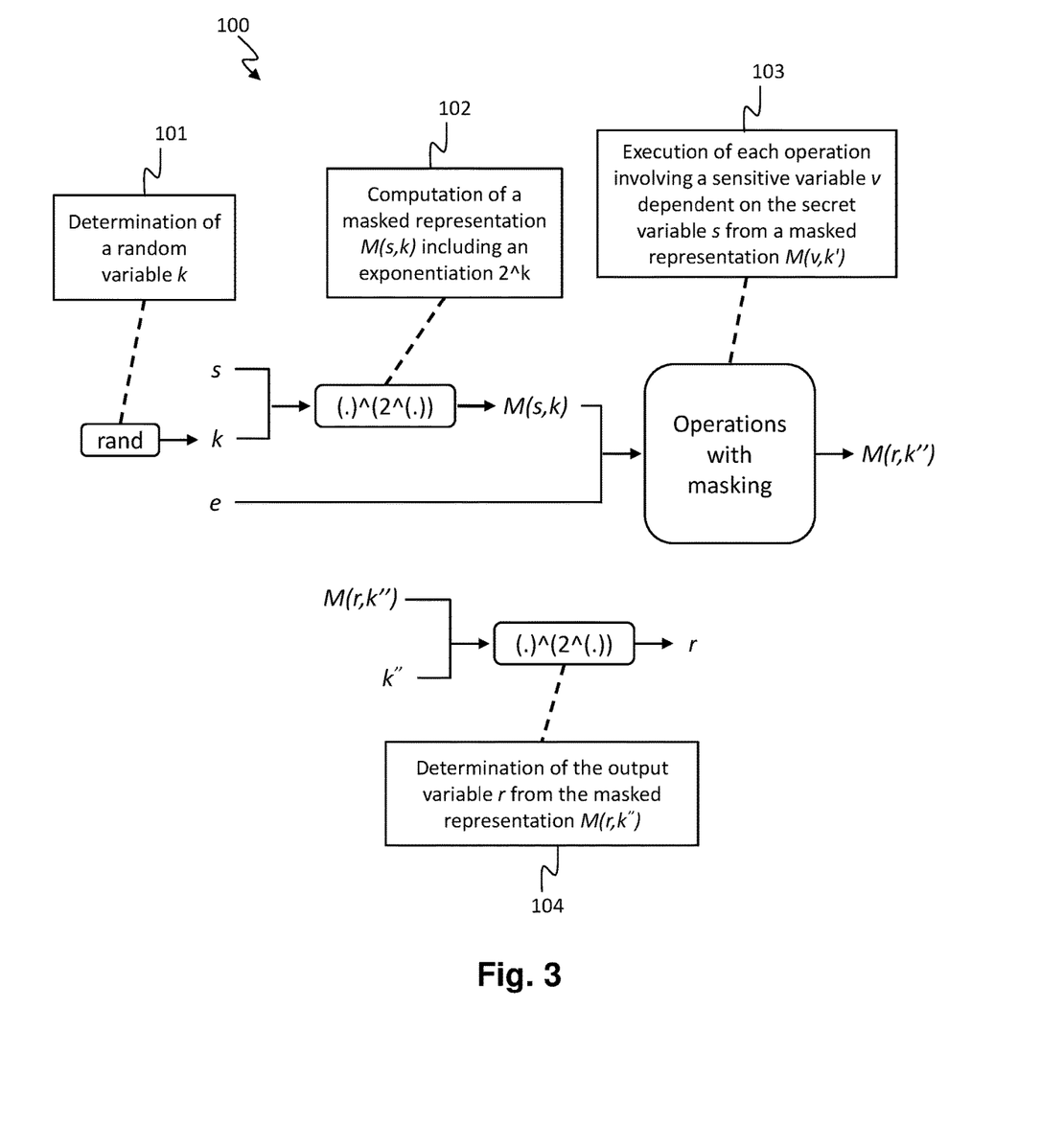
FIG. 3 schematically represents a method according to the invention for protecting the implementation of a cryptographic algorithm against side-channel attacks.

FIG. 3 schematically represents a method 100 for executing the cryptographic algorithm using a specific masking to protect the electronic device 10 against side-channel attacks. The method 100 is implemented by the code instructions 13.

The method 100 particularly includes a determination 101 of a random variable k and the computation 102 of a masked representation M(s, k) of the secret variable s. As illustrated in FIG. 3, the masking function M includes an exponentiation by a power of two. More specifically, the determination 101 of the masked representation M(s, k) of the secret variable s includes an exponentiation by $2^{\wedge}k$ (exponentiation to the power $2^{\wedge}k$). The exponentiation by $2^{\wedge}k$ may be operated directly on the secret variable s or on an operation involving the secret variable s.

For each operation involving the secret variable s, the operation is executed from the masked representation M(s, k) of the secret variable s, and not directly from the secret variable s. An intermediate variable obtained from an operation involving the masked representation M(s, k) of the secret variable s is also obtained in the form of a masked representation. The subsequent operations which relate to this intermediate variable are in turn executed by accounting for the representation thereof in masked form.

Thus, for each operation involving a sensitive variable v corresponding to the secret variable s or to an intermediate result obtained from said secret variable s, the method 100 includes the execution 103 of said operation from a masked representation M(v, k') of the sensitive variable v. The variable k' can be equal to the variable k, but it can also, as will be detailed hereinafter, adopt another value defined from the variable k. Indeed, and optionally, the value of the exponent used for masking can change during the operations (for example if an operation corresponds to an exponentiation by a power of two, or if the mask is changed by taking a new random variable to define the value of the exponent).

Finally, the method 100 includes an addition of a determination 104 of an output variable r of the cryptographic algorithm from a final result obtained in the form of a masked representation M(r,k"). Here again, the variable k" can be equal to the variable k, but it can also take another value determined from the variable k and according to the different operations executed. The output variable r is for example obtained from the masked representation M(r, k") by performing an exponentiation by $2^{\wedge}(-k")$.

Steps 101 through 104 are performed at each execution of the cryptographic algorithm. This means that at each new execution of the cryptographic algorithm, a new value is randomly determined for the variable k.

With such arrangements, the variables used in the operation implementing the cryptographic algorithm reveal much less information on the secret variable. A side-channel attack aimed at obtaining the value of the secret variable is then difficult to carry out.

The invention is based particularly on the fact that, in a binary finite field, for a predetermined variable p, the following relations are verified:

$$\forall (a,b \in GF(2^n)), (a \oplus b)^{\wedge}(2^{\wedge}p) = a^{\wedge}(2^{\wedge}p) \oplus b^{\wedge}(2^{\wedge}p) \quad [\text{Math.5}]$$

$$\forall (a,b \in GF(2^n)), (a \otimes b)^{\wedge}(2^{\wedge}p) = a^{\wedge}(2^{\wedge}p) \otimes b^{\wedge}(2^{\wedge}p) \quad [\text{Math.6}]$$

$$\forall (a,b \in GF(2^n)), (a^{\wedge}b)^{\wedge}(2^{\wedge}p) = (a^{\wedge}(2^{\wedge}p))^{\wedge}b \quad [\text{Math.7}]$$

The exponent corresponding to the variable p is a positive integer. This exponent can particularly belong to $GF(2^n)$. The exponent will however generally be chosen from integers within the range $[\![1, n-1]\!]$ as in $GF(2^n)$, the exponentiation by $(2^{\wedge}p)$ is equivalent to the exponentiation by $(2^{\wedge}(p \% n))$ (the operator % corresponding to the "modulo" operator).

In a specific embodiment, the masking function M (x, p) is a so-called "square masking" function defined such that, for a predetermined variable p, we have:

$$\forall x \in GF(2^n), M(x,p) = x^{\wedge}(2^{\wedge}p). \quad [\text{Math.1}]$$

Let us consider, by way of non-limiting example, that in the absence of masking, the operations of the cryptographic algorithm correspond to the following operations:

$$v_1 = e \oplus i \quad [\text{Math.8}]$$

$$v_2 = s \oplus v_1 \quad [\text{Math.9}]$$

$$v_3 = v_2 \otimes m \quad [\text{Math.10}]$$

$$r = v_3^{\wedge}(2^{\wedge}j) \quad [\text{Math.11}]$$

The variable s is a secret variable; the variable e is a public variable corresponding to an item of input information; the variable r corresponds to an item of output information. The variables i and j are public variables.

To protect against a side-channel attack, it is necessary to execute these operations such that they do not directly use the secret variable s or a sensitive intermediate variable obtained from the secret variable s.

The operation [Math.8] does not involve the secret variable s. The operation [Math.8] also does not involve an intermediate variable obtained from the secret variable s. It is therefore not necessary to modify this operation as it does not handle sensitive variables.

On the other hand, the operation [Math.9] involves the secret variable s. Therefore, it is necessary to use square masking representation $M(s, k)$ of the secret variable s to execute this operation. A square masking representation $M(v_1, k)$ of the variable $v_1$ is also computed. The operation $\oplus$ is then executed between the square masking representations of the variables s and $v_1$. Based on the relation [Math.5], it can be observed that the result obtained is then the square masking representation $M(v_2, k)$ of the variable $v_2$:

$$M(v_2, k) = v_2 \wedge (2 \wedge k) = (s \oplus v_1) \wedge (2 \wedge k) \quad \text{[Math.12]}$$
$$= (s \wedge (2 \wedge k)) \oplus (v_1 \wedge (2 \wedge k))$$
$$= M(s, k) \oplus M(v_1, k)$$

The operation [Math.10] involves the intermediate variable $v_2$ which was obtained from the secret variable s. The variable $v_2$ is therefore a sensitive variable that is to be protected against a side-channel attack. Therefore, it is necessary to use square masking representation of the variable $v_2$. The square masking representation of the variable $v_2$ corresponds to the result of the operation [Math.9]. It is also necessary to compute a square masking representation $M(m, k)$ of the variable m. The operation $\otimes$ is then executed between the square masking representations of the variables m and $v_2$. Based on the relation [Math.6], it can be observed that the result obtained is then a square masking representation $M(v_3, k)$ of the variable $v_3$:

$$M(v_3, k) = v_3 \wedge (2 \wedge k) = (v_2 \oplus m) \wedge (2 \wedge k) \quad \text{[Math.13]}$$
$$= (v_2 \wedge (2 \wedge k)) \oplus (m \wedge (2 \wedge k))$$
$$= M(v_2, k) \oplus M(m, k)$$

The operation [Math.11] involves the intermediate variable $v_3$ which was obtained from the sensitive variable $v_2$, in turn obtained from the secret variable s. The variable $v_3$ is therefore a sensitive variable that is to be protected against a side-channel attack. Therefore, it is necessary to use square masking representation of the variable $v_3$. The square masking representation of the variable $v_3$ corresponds to the result of the operation [Math.10]. The exponentiation by $(2\hat{\ }j)$ is then executed on the square masking representation of the variable $v_3$. Based on the relation [Math.7], it can be observed that the result obtained is then a square masking representation $M(r, k)$ of the variable r:

$$M(r,k)=r\hat{\ }(2\hat{\ }k)=(v_3\hat{\ }(2\hat{\ }j))\hat{\ }(2\hat{\ }k)=(v_3\hat{\ }(2\hat{\ }k))\hat{\ }(2\hat{\ }j)=M(v_3, k)\hat{\ }(2\hat{\ }j) \quad \text{[Math.14]}$$

It is then possible to determine the output information of the cryptographic algorithm corresponding to the variable r from the square masking representation $M(r, k)$ of the variable r and from the variable k:

$$r=M(r,k)\hat{\ }(2\hat{\ }(-k)) \quad \text{[Math.15]}$$

It should be noted that the value of the exponent used in the square masking representation can vary during the operations.

For example, to execute the operation [Math.11], it could be envisaged to change the value of the exponent of the square masking function rather than executing an exponentiation by $(2\hat{\ }j)$. The new value of the exponent of the square masking function is then $(2\hat{\ }k')$ with $k'=k+j$. Indeed:

$$(v_3\hat{\ }(2\hat{\ }k))\hat{\ }(2\hat{\ }j)=v_3\hat{\ }(2\hat{\ }(k+j))=M(v_3,k+j)=M(v_3,k') \quad \text{[Math.16]}$$

It can also be envisaged to change square masking at different steps of the cryptographic algorithm by changing the value of the exponent of the square masking function at random. Such arrangements make it possible to increase the protection against side-channel attacks further. It is for example possible to determine a random variable k" and define a new square masking representation $M(v,k")$ of a square masking representation $M(v, k)$ by computing:

$$M(v,k")=M(v,k)\hat{\ }(2\hat{\ }(k"-k)) \quad \text{[Math.17]}$$

It should also be noted that the cryptographic algorithm can use several secret variables. In this case, a masked representation must be computed for each secret variable. Each masked value can optionally be masked with a different exponent value. Let us consider for example that a square masking representation $M(s_1, k_1)$ is computed to mask a first secret variable $s_1$ and that a square masking representation $M(s_2,k_2)$ is computed to mask a second secret variable $s_2$; $k_1$ and $k_2$ being two different random variables. In this case, it is necessary to change square masking when an operation involves the two variables $s_1$ and $s_2$, or when an operation involves two variables each obtained from the variables $s_1$ and $s_2$.

Let us suppose, by way of non-limiting example, that in the absence of masking, the cryptographic algorithm includes the following operations:

$$v_1=e \oplus s_1 \quad \text{[Math.18]}$$

$$v_2=v_1 \oplus s_2 \quad \text{[Math.19]}$$

The operation [Math.18] involves the secret variable $s_1$. Therefore, it is necessary to use square masking representation $M(s_1, k_1)$ of the secret variable $s_1$ to execute this operation. It is also necessary to compute a square masking representation of the variable e. The operation $\oplus$ is then executed between the square masking representations of the variables e and $s_1$. The result obtained is then the square masking representation $M(v_1, k)$ of the variable $v_1$:

$$M(v_1, k_1) = v_1 \wedge (2 \wedge k_1) = (e \oplus s_1) \wedge (2 \wedge k_1) \quad \text{[Math.20]}$$
$$= (e \wedge (2 \wedge k_1)) \oplus (s_1 \wedge (2 \wedge k_1))$$
$$= M(e, k_1) \oplus M(s_1, k_1)$$

The operation [Math.19] involves the secret variable $s_2$ and the variable $v_1$ obtained from the secret variable $s_1$. It is then necessary, firstly, to change square masking for at least one of the variables $s_2$ and $v_1$ such that they each have a square masking representation using the same exponent. For example, the square masking representation $M(v_1, k_2)$ is computed for the secret variable $v_1$:

$$M(v_1,k_2)=M(v_1,k_1)\wedge(2\wedge(k_2-k_1)) \quad [\text{Math.21}]$$

It is then necessary to execute the operation $\oplus$ between the square masking representations of the variables $s_2$ and $v_1$ which are based on the same exponent value ($2\wedge k_2$). The result obtained is then the square masking representation $M(v_2,k_2)$ of the variable $v_2$:

$$M(v_2, k_2) = v_2\wedge(2\wedge k_2) = (v_1 \oplus s_2)\wedge(2\wedge k_2) \quad [\text{Math.22}]$$
$$= (v_1\wedge(2\wedge k_2)) \oplus (s_2\wedge(2\wedge k_2))$$
$$= M(v_1, k_2) \oplus M(s_2, k_2)$$

Up to this point, we have considered the addition, multiplication and power operations as binary finite field operations. These operations are particularly suitable for square masking as they have a linear behaviour with respect to an exponentiation by a power of two (see the relations [Math.5] to [Math.7]). The cryptographic algorithm can however include other operations which are not necessarily suitable for square masking. This is for example the case for a bitwise shift, a sign extent, for "AND" and "OR" Boolean operations, or for access to a table indexed with a secret.

In such a case, it is possible to perform a temporary conversion of the square masking to another type of masking, referred to as "conversion masking". It can consist for example of a Boolean masking, a multiplicative masking, an affine masking, or an arithmetic masking. Once the operation has been executed using conversion masking, an inverse conversion is applied to return to square masking.

Let us consider, by way of non-limiting example, that in the absence of masking, the cryptographic algorithm includes the following operations:

$$v_1 = e \oplus s \quad [\text{Math.23}]$$

$$v_2 = \text{shiftleft}(v_1, 3) \quad [\text{Math.24}]$$

$$v_3 = v_2 \oplus a \quad [\text{Math.25}]$$

The variable e corresponds to an item of public input information; the variable s corresponds to a secret key; the variable a is public. A square masking representation $M(s, k)$ is computed to mask the secret variable s.

To execute the operation [Math.23], a square masking representation $M(e,k)$ is computed for the secret variable e, and the operation $\oplus$ is performed between the square masking representations of the variables e and s. The result obtained is then the square masking representation $M(v_1, k)$ of the variable $v_1$:

$$M(v_1, k) = v_1\wedge(2\wedge k) = (e \oplus s)\wedge(2\wedge k) \quad [\text{Math.26}]$$
$$= (e\wedge(2\wedge k)) \oplus s\wedge(2\wedge k))$$
$$= M(e, k) \oplus M(s, k)$$

The operation [Math.24] corresponds to a three-bit left shift of the variable $v_1$. To execute this operation in a masked manner, it is possible for example to perform a conversion to a Boolean masking. Indeed, the bitwise shift operation is an operation which is performed relatively easily in the form of Boolean masking.

To switch to a representation in Boolean masking form from a representation in square masking form $M(v_1,k)$, it is necessary to determine two variables $v'_1$ and $v''_1$ at random such that $v_1 = v'_1 \oplus v''_1$. In this aim, the variable v is determined at random and the variable $v''_1$ is defined such that:

$$v''_1 = (v_1'(2\wedge k) \oplus M(v_1,k))\wedge(2\wedge(-k)) \quad [\text{Math.27}]$$

The variables $v'_1$ and $v''_1$ then form the two shares of the Boolean masking representation of the variable $v_1$. The left shift operation can then be performed conventionally on the Boolean masking representation of the variable $v_1$.

The result obtained at the output of the left shift operation is a Boolean masking representation taking the form of two variables $r'_1$ and $r''_1$. To switch back to a representation in square masking form, it is necessary to determine a square masking representation $M(v_2, k)$ of the variable $v_2$ such that:

$$M(v_2,k)=r'_1\wedge(2\wedge k)\oplus r''_1\wedge(2\wedge k)=(r'_1 \oplus r''_1)\wedge(2\wedge k) \quad [\text{Math.28}]$$

To execute the operation [Math.25], a square masking representation $M(a, k)$ is computed for the secret variable a, and the operation $\oplus$ is performed between the square masking representations of the variables a and $v_2$. The result obtained is then the square masking representation $M(v_3, k)$ of the variable $v_3$:

$$M(v_3, k) = v_3\wedge(2\wedge k) = (v_2 \oplus a)\wedge(2\wedge k) \quad [\text{Math.29}]$$
$$= (v_2\wedge(2\wedge k)) \oplus a\wedge(2\wedge k))$$
$$= M(v_2, k) \oplus M(a, k)$$

To execute certain operations, it can also be envisaged to perform a conversion to a multiplicative masking.

To switch from a square masking representation $M(v,p)$ of a variable v to a representation in multiplicative masking form, it is necessary to determine two variables v' and v" at random such that $v"=v'\otimes v$. In this aim, the variable v' is determined at random and the variable v" is defined such that:

$$v"=(v'\wedge(2\wedge p)\otimes M(v,p))\wedge(2\wedge(-p)) \quad [\text{Math.30}]$$

The variables v' and v" then form the two shares of the multiplicative masking representation of the variable v. The operation considered can then be performed conventionally on the multiplicative masking representation of the variable v.

The result obtained is a multiplicative masking representation taking the form of two variables r' and r". To switch back to a representation in square masking form, it is necessary to determine a square masking representation $M(r, p)$ such that:

$$M(r,p)=r'\wedge(-(2\wedge p))\otimes r''\wedge(2\wedge p) \quad [\text{Math.31}]$$

To execute certain operations, it can also be envisaged to perform a conversion to an affine masking.

To switch from a square masking representation $M(v, p)$ of a variable v to an affine masking representation, it is necessary to determine three variables v', v", and v''' at random such that $v'''=v'\oplus v\oplus v"$. In this aim, the variables v' and v" are determined at random, and the variable v''' is defined such that:

$$v'''=(v'\wedge(2\wedge p)\otimes M(v,p)\otimes v''\wedge(2\wedge p))\wedge(2\wedge(-p)) \quad [\text{Math.32}]$$

The variables v', v" and v''' then form the three shares of the affine masking representation of the variable v. The operation considered can then be performed conventionally on the affine masking representation of the variable v.

The result obtained is an affine masking representation taking the form of three variables r',r'',r''' such that r'''=r'⊗r ⊕ r''. To switch back to a square masking representation, it is necessary to determine a square masking representation M(r,p) such that:

$$M(r,p) = (r'''(2\hat{\ }p) \oplus r'''(2p)) \otimes r'\hat{\ }(-(2\hat{\ }p))$$ [Math.33]

To execute certain operations, it can also be envisaged to perform a conversion to an arithmetic masking. The conversion from square masking to arithmetic masking can be performed by performing a first conversion to Boolean masking, followed by a second conversion from Boolean masking to arithmetic masking. Conversely, the inverse conversion from arithmetic masking to square masking can be performed by performing a first conversion from arithmetic masking to Boolean masking, followed by a second conversion from Boolean masking to square masking. The conversion from Boolean masking to arithmetic masking and the conversion from arithmetic masking to Boolean masking are known to a person skilled in the art (see for example the document "*A Sound Method for Switching between Boolean and Arithmetic Masking*", L. GOUBIN).

To execute certain operations, rather than use a masking conversion, it can also be envisaged to perform a polynomial interpolation of the operation and a computation of a square masking representation of the interpolating polynomial.

Finally, to execute certain operations, it is also possible to tabulate the operation and mask the table, in a similar manner to the conventional procedure in Boolean masking (see for example the document "*Higher Order Masking of Look-Up Tables*", J. S. CORON).

To increase the security level, square masking can be combined with other types of masking, for example a Boolean masking, a multiplicative masking or an affine masking.

In specific implementations, the masking function M is a function combining a square masking and a Boolean masking. The masking function M can then be defined by one of the following expressions (a and p being predetermined variables taken at random):

$$\forall x \in GF(2^n), M(x,p,a) = x\hat{\ }(2\hat{\ }p) \oplus a,$$

$$\forall x \in GF(2^n), M(x,p,a) = (x \oplus a)\hat{\ }(2\hat{\ }p).$$ [Math.2]

In specific implementations, the masking function M is a function combining a square masking and a multiplicative masking. The masking function M can then be defined by one of the following expressions (m and p being predetermined variables taken at random, m being a non-zero variable):

$$\forall x \in GF(2^n), M(x,p,m) = x\hat{\ }(2\hat{\ }p) \otimes m,$$

$$\forall x \in GF(2^n), M(x,p,m) = (x \otimes m)\hat{\ }(2\hat{\ }p),$$ [Math.3]

In specific implementations, the masking function M is a function combining a square masking and an affine masking. The masking function M can then be defined by one of the following expressions (a, m and p being predetermined variables taken at random, m being a non-zero variable):

$$\forall x \in GF(2^n), M(x,p,m,a) = (x \otimes m \oplus a)\hat{\ }(2\hat{\ }p),$$

$$\forall x \in GF(2^n), M(x,p,m,a) = (x \otimes m)\hat{\ }(2\hat{\ }p) \oplus a,$$

$$\forall x \in GF(2^n), M(x,p,m,a) = m \otimes x\hat{\ }(2\hat{\ }p) \oplus a,$$

$$\forall x \in GF(2^n), M(x,p,m,a) = m \otimes (x\hat{\ }(2\hat{\ }p) \oplus a),$$

$$\forall x \in GF(2^n), M(x,p,m,a) = m \otimes (x \oplus a)\hat{\ }(2\hat{\ }p),$$

$$\forall x \in GF(2^n), M(x,p,m,a) = (m \otimes (x \oplus a))\hat{\ }(2\hat{\ }p).$$ [Math.4]

Figure 4:
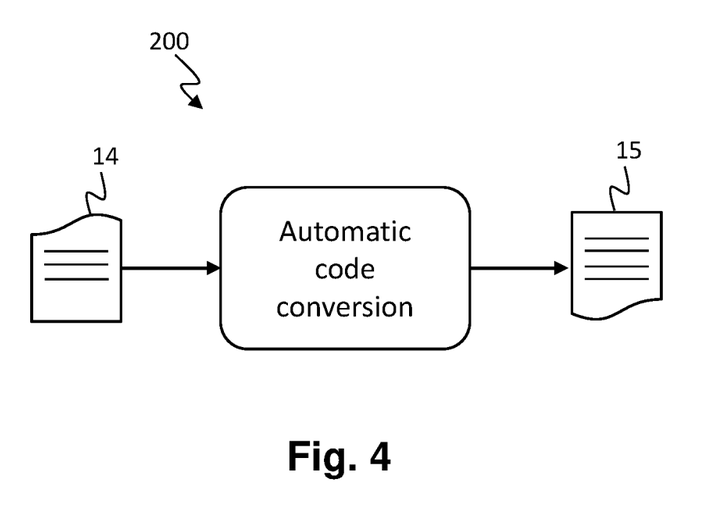
FIG. 4 schematically represents a method for automatically converting code instructions of a cryptographic algorithm in order to protect the implementation thereof against side-channel attacks.

As illustrated in FIG. 4, the present invention also relates to a method 200 for automatically converting code instructions 14 of a cryptographic algorithm in order to protect the implementation thereof against side-channel attacks.

In FIG. 4, the code instructions 14 correspond to an implementation of the cryptographic algorithm which is not protected against side-channel attacks. The code instructions 15 obtained at the output of the method 200 correspond to an implementation of the cryptographic algorithm which is protected against side-channel attacks.

The method 200 is implemented by an automatic code conversion computing tool. The objective of the method 200 is that of modifying the code instructions 14 to obtain new code instructions 15 which protect the implementation of the cryptographic algorithm against side-channel attacks. The protection is based on the masking function M described above (masking function M which includes an exponentiation by a power of two in which the exponent is taken at random).

Figure 5:
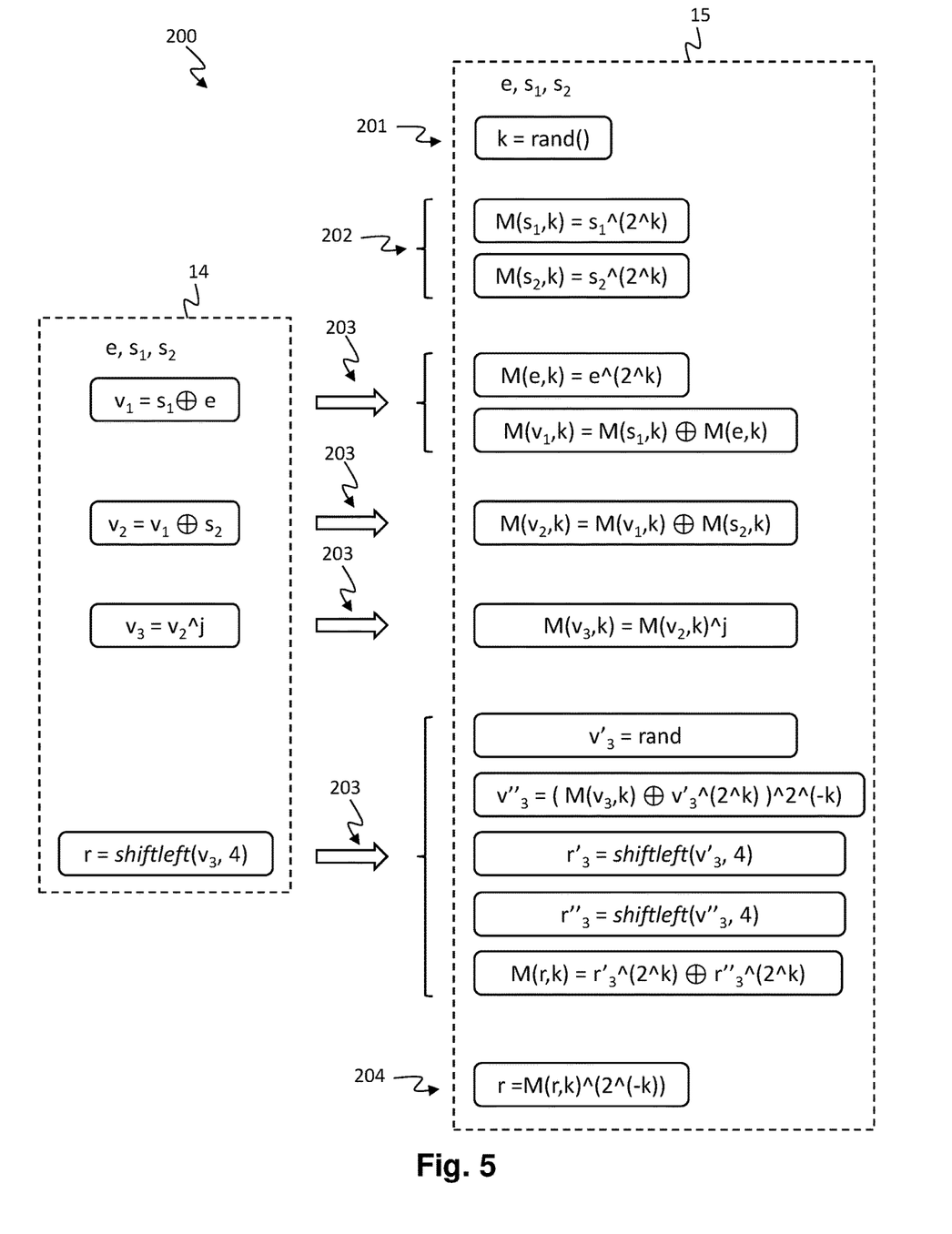
FIG. 5 illustrates an example of conversion of the code instructions of a cryptographic algorithm in order to protect the implementation thereof against side-channel attacks.

FIG. 5 gives an illustrative and non-limiting example of the implementation of the method 200 for converting code instructions 14 of a cryptographic algorithm in order to protect the implementation thereof against side-channel attacks.

In the example considered and illustrated in FIG. 5, the cryptographic algorithm uses two secret variables $s_1$ and $s_2$. However, it should be noted that the invention also applies to scenarios wherein the cryptographic algorithms use only one single secret variable, or a number of secret variables greater than two. The variable e is a public variable corresponding to an item of input information; the variable i is also a public variable.

The method 200 includes the addition 201 of a determination of a random variable k and the addition 202 of a computation of a masked representation M ($s_1$, k) and M($s_2$, k) respectively for each of the secret variables $s_1$ and $s_2$.

In the example considered, the masking function M(x, k) is a square masking function defined such that M(x,k)=x^(2^k). However, it should be noted that, in alternative embodiments, a masking function combining square masking with another type of masking could also be used (for example a combination of square masking with a Boolean masking, a multiplicative masking or an affine masking, as described above).

It should also be noted that, in the example considered, the same random variable k is used to compute the square masking representations of the variables $s_1$ and $s_2$. However, nothing would prevent, in alternative embodiments, and as described above, taking two different random variables to compute the square masking representations of the variables $s_1$ and $s_2$.

The method 200 also includes a transformation 203 of each operation involving a sensitive variable corresponding to a secret variable or to an intermediate result obtained from a secret variable, such that said operation is performed from a masked representation of said sensitive variable.

For example, when an operation corresponds to a binary finite field addition between two variables of which at least one is a sensitive variable (this is the case for example of the operation $v_1 = s_1 \oplus e$ and the operation $v_2 = v_1 \oplus s_2$ illustrated in FIG. 5), then the corresponding code instruction is converted so that the operation is performed between the square masking representations of the two variables. It is necessary to add the computation of the square masking representation of a variable involved in this operation if this variable is not already available in the form of a square masking representation (this is the case for the variable e in the example illustrated in FIG. 5).

The same would apply for an operation corresponding to a binary finite field multiplication between two variables of which at least one is a sensitive variable: the corresponding code instruction would be converted so that the operation is performed between the square masking representations of the two variables (it would also be necessary there to add the computation of the square masking representation of a variable not already available in the form of a square masking representation).

When an operation corresponds to an exponentiation of a sensitive variable (as is the case for the operation $v_3 = v_2\hat{\ }j$ illustrated in FIG. 5), the corresponding code instruction is converted so that the operation is performed on the square masking representation of the variable rather than on the variable per se.

When an operation involves a sensitive variable and this operation is not readily transposable for a square masking representation (for example the bitwise left shift operation shiftleft($v_3$, 4) illustrated in FIG. 5, then the corresponding code instruction is converted into a plurality of code instructions to successively perform a conversion from the square masking representation to a conversion masking (for example a Boolean masking, as is the case in the example illustrated in FIG. 5), an execution of the operation using the conversion masking representation, followed by a conversion of the result of the operation from conversion masking to square masking.

Finally, the method 200 includes the addition 204 of a determination of an output variable r of the cryptographic algorithm from a final result obtained in the form of the masked representation M(r, k). In the example considered and illustrated in FIG. 5, it is simply necessary to exponentiate M(r,k) to the power $2\hat{\ }(-k)$ to obtain the output variable r.

It should be noted that, for simplification purposes, the example illustrated in FIG. 5 only includes a small number of operations. The operations and the code instructions for implementing these operations can however be significantly greater.

In addition, and as described above, the value of the exponent used for square masking can vary during the operations, for example if changes are made to the value of the square masking exponent at different steps of the algorithm to increase the security level further, or when an operation corresponds to an exponentiation by a power of two.

Square masking is particularly suitable for binary finite field addition, multiplication and power. Indeed, the extra cost in terms of computing complexity to protect these square masking operations is relatively low. Indeed, once the masking of the secret variables is performed, the extra cost for each of these operations corresponds at most to the computation of a power.

By way of comparison, for binary finite field multiplication and power, Boolean masking is considerably more costly than square masking.

The inventors made measurements of the execution time of an AES algorithm. On an implementation without the use of masked tables, the AES execution time is multiplied by 11.54 for a Boolean masking, and by 4.84 for a square masking. On an implementation using masked tables, the AES execution time is multiplied by 6.24 for a Boolean masking, and by 1.30 for a square masking. Square masking is therefore significantly more effective than Boolean masking when it is applied to an AES algorithm.

Furthermore, square masking provides very satisfactory protection against side-channel attacks. In particular, square masking has a good resistance against leaks in transition. Indeed, leaks in transition are modelled by an "exclusive OR" between two variables. In the case of square masking, the "exclusive OR" of two masked variables also produces a masked result, thanks to the linearity of the power of two operation with respect to the "exclusive OR".

Therefore, square masking provides an advantageous compromise in terms of security and performance for certain cryptographic algorithms, and particularly for algorithms which make extensive use of binary finite field addition, multiplication and power operations.

The invention claimed is:

1. A method for protecting an electronic device against side-channel attacks, the electronic device including processing circuitry configured to execute a cryptographic algorithm comprising operations on elements belonging to a binary finite field GF($2^n$), n being a positive integer, at least some of the operations involving at least one secret variable s to be protected, the method being implemented by the processing circuitry of the electronic device, the method comprising:

determining a random variable k, computing a masked representation M(s, k) of the secret variable s using a masking function M including an exponentiation by $2\hat{\ }k$, the operator $\hat{\ }$ corresponding to a binary finite field power, for each operation involving a sensitive variable v corresponding to the secret variable s or to an intermediate result obtained from the secret variable s, executing said operation from a masked representation M(v,k') of the sensitive variable v, and determining an output variable r of the cryptographic algorithm from a final result obtained in a form of a masked representation M(r, k"), wherein the variables k' and k" are determined from the random variable k.

2. The method according to claim 1, wherein the masking function M is a square masking function such that, for a predetermined variable p:

$$\forall x \in GF(2^n), M(x,p) = x\hat{\ }(2\hat{\ }p).$$

3. The method according to claim 2 wherein, when the operation involving the sensitive variable v corresponds to a binary finite field addition involving another variable w, the execution of the operation comprises:

computing a square masking representation M(w, k') of the other variable w, computing a binary finite field addition of M(v, k') with M(w, k').

4. The method according to claim 2 wherein, when the operation involving the sensitive variable v corresponds to a binary finite field multiplication involving another variable z, the execution of the operation comprises:

computing a square masking representation M(z, k') of the other variable z, computing a binary finite field multiplication of M(v, k') with M(z, k').

5. The method according to claim 2, wherein, for at least one operation involving a sensitive variable v, the execution of the operation comprises:

converting the square masking representation of the sensitive variable v to another masking, the another masking being a conversion masking, executing the operation using the conversion masking representation of the sensitive variable v, and converting a result of the operation from the conversion masking to the square masking.

6. The method according to claim 5, wherein the conversion masking is a Boolean masking, the conversion from the square masking representation M(v, k') of the sensitive variable v to a Boolean masking representation includes:

determining a random variable $v_0$, and computing a variable $v_1$ such that $v_1 = (v_0{}^\wedge(2^\wedge k') \oplus v^\wedge(2^\wedge k'))^\wedge(2^\wedge(-k'))$, the operator $\oplus$ corresponding to a binary finite field addition, wherein the variables $v_0$ and $v_1$ form a Boolean masking representation whereon the operation is performed in order to obtain a result in a form of a Boolean masking representation taking the form of two variables $r_0$ and $r_1$, and the conversion of the result obtained to square masking includes the computation of a square masking representation in a form $r_0{}^\wedge(2^\wedge k') \oplus r_1{}^\wedge(2^\wedge k') = (r_1 \oplus r_2)^\wedge(2^\wedge k')$.

7. The method according to claim 5, wherein the conversion masking is a multiplicative masking, the conversion from the square masking representation M(v, k') of the sensitive variable v to a multiplicative masking representation includes:

determining a non-zero random variable $v_0$, and computing a variable $v_1$ such that $v_1 = (v_0{}^\wedge(2^\wedge k') \otimes v^\wedge(2^\wedge k'))^\wedge(2^\wedge(-k))$, the operator $\otimes$ corresponding to a binary finite field multiplication, wherein the variables $v_0$ and $v_1$ form a multiplicative masking representation whereon the operation is performed in order to obtain a result in a form of a multiplicative masking representation taking the form of two variables $r_0$ and $r_1$, and the conversion of the result obtained to square masking includes the computation of a square masking representation in a form $r_0{}^\wedge(-(2^\wedge k')) \otimes r_1{}^\wedge(2^\wedge k')$.

8. The method according to claim 2, wherein, for at least one operation involving a sensitive variable, the execution of the operation comprises a polynomial interpolation of the operation and a computation of a square masking representation of an evaluation of said interpolating polynomial.

9. The method according to claim 1, wherein the masking function M is a function combining a square masking and a Boolean masking, the masking function M being defined, for two predetermined variables p and a, according to one of the following expressions:

$$\forall x \in GF(2^n), M(x,p,a) = x^\wedge(2^\wedge p) \oplus a,$$

$$\forall x \in GF(2^n), M(x,p,a) = (x \oplus a)^\wedge(2^\wedge p),$$

the operator $\oplus$ corresponding to a binary finite field addition.

10. The method according to claim 1, wherein the masking function M is a function combining a square masking and a multiplicative masking, the masking function M being defined, for a predetermined non-zero variable m and a predetermined variable p, according to one of the following expressions:

$$\forall x \in GF(2^n), M(x,p,m) = x^\wedge(2^\wedge p) \otimes m, \text{ and}$$

$$\forall x \in GF(2^n), M(x,k,m) = (x \otimes m)^\wedge(2^\wedge k),$$

m being a non-zero random variable, the operator $\otimes$ corresponding to a binary finite field multiplication.

11. The method according to claim 1, wherein the masking function M is a function combining a square masking and an affine masking, the masking function M being defined, for a non-zero variable m and two predetermined variables p and a, according to one of the following expressions:

$$\forall x \in GF(2^n), M(x,p,m,a) = (x \otimes m \oplus a)^\wedge(2^\wedge p),$$

$$\forall x \in GF(2^n), M(x,p,m,a) = (x \otimes m)^\wedge(2^\wedge p) \oplus a,$$

$$\forall x \in GF(2^n), M(x,p,m,a) = m \otimes x^\wedge(2^\wedge p) \oplus a,$$

$$\forall x \in GF(2^n), M(x,p,m,a) = m \otimes (x^\wedge(2^\wedge p) \oplus a),$$

$$\forall x \in GF(2^n), M(x,p,m,a) = m \otimes (x \oplus a)^\wedge(2^\wedge p), \text{ and}$$

$$\forall x \in GF(2^n), M(x,p,m,a) = (m \otimes (x \oplus a))^\wedge(2^\wedge p),$$

the operator $\oplus$ corresponding to a binary finite field addition, and the operator $\otimes$ corresponding to a binary finite field multiplication.

12. A non-transitory computer-readable medium storing code instructions which, when executed by the processing circuitry of the electronic device, configure the processing circuitry to execute the method according to claim 1.

13. An electronic device comprising the processing and the computer-readable storage medium according to claim 12.

14. A method for protecting an electronic device against side-channel attacks, the electronic device including processing circuitry configured to execute code instructions of a cryptographic algorithm comprising operations on elements belonging to a binary finite field $GF(2^n)$, n being a positive integer, at least some of the operations involving at least one secret variable s to be protected, the method comprising modifying the code instructions by an automatic code conversion computing tool, wherein the modification of the code instructions includes:

adding a determination of a random variable k, adding a computation of a masked representation M(s, k) of the secret variable s using a masking function M including an exponentiation by $2^\wedge k$, the operator $^\wedge$ corresponding to a binary finite field power, transforming each operation involving a sensitive variable v corresponding to the secret variable s or to an intermediate result obtained from said secret variable s, such that the operation is performed from a masked representation M(v, k') of the sensitive variable v, and adding a determination of an output variable r of the cryptographic algorithm from a final result obtained in the form of a masked representation M(r, k"), wherein the variables k' and k" are determined from the variable k.

15. A non-transitory computer-readable medium storing code instructions which, when executed by the processing circuitry, configure the processing circuitry to modify code instructions of the cryptographic algorithm according to the method as claimed in claim 14.

* * * * *